No. 819,706. PATENTED MAY 8, 1906.
T. ABTMEYER.
ELECTRICAL MEASURING INSTRUMENT.
APPLICATION FILED SEPT. 10, 1904.

3 SHEETS—SHEET 1.

WITNESSES:
C. L. Belcher
Otto S. Schairer

INVENTOR
Theodore Abtmeyer
BY
Wesley G. Carr
ATTORNEY

No. 819,706. PATENTED MAY 8, 1906.
T. ABTMEYER.
ELECTRICAL MEASURING INSTRUMENT.
APPLICATION FILED SEPT. 10, 1904.
3 SHEETS—SHEET 2.
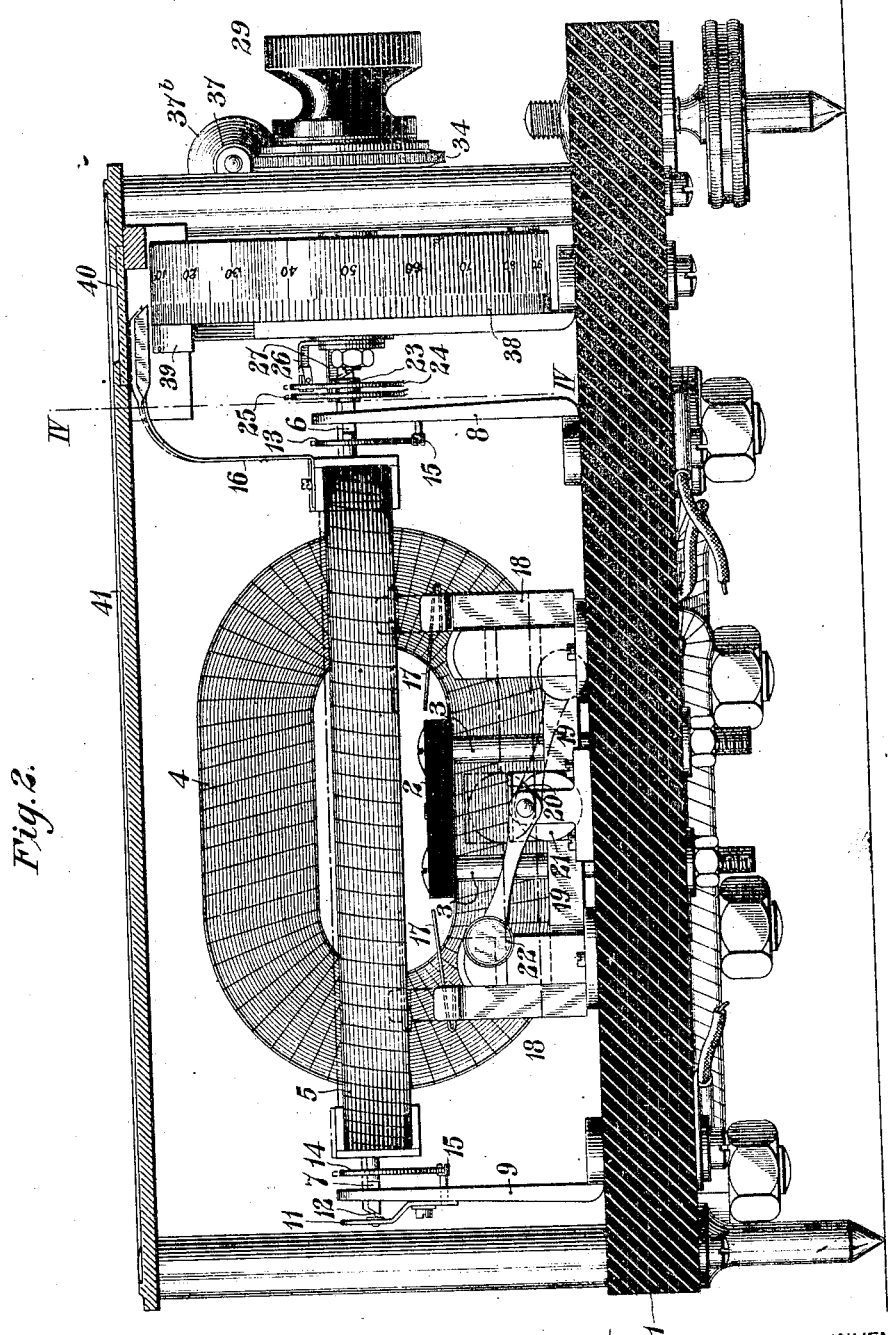
WITNESSES:
C. L. Belcher
Otto S. Schairer.
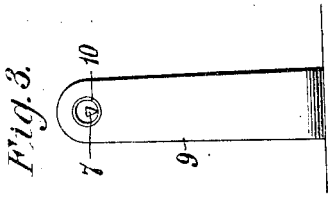
INVENTOR
Theodore Abtmeyer
BY
Wesley G. Carr
ATTORNEY No. 819,706. PATENTED MAY 8, 1906.
T. ABTMEYER.
ELECTRICAL MEASURING INSTRUMENT.
APPLICATION FILED SEPT. 10, 1904.

3 SHEETS—SHEET 3.

WITNESSES:
C. L. Belcher
Otto S. Schairer

INVENTOR
Theodore Abtmeyer
BY
Wesley J. Carr
ATTORNEY

UNITED STATES PATENT OFFICE.

THEODORE ABTMEYER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

No. 819,706.     Specification of Letters Patent.     Patented May 8, 1906.

Application filed September 10, 1904. Serial No. 223,986.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Electrical Measuring Instruments, of which the following is a specification.

My invention relates to instruments for measuring electricity, and particularly to the indicating devices which constitute parts of such instruments.

The object of my invention is to provide means whereby the forces that act to produce deflections of the movable member of a measuring instrument may be indicated at a suitable location and be read without difficulty.

Another object of my invention is to provide such indicating means as will permit of the use of horizontal-axis instruments in lieu of many of the vertical-axis instruments that have been heretofore generally used.

Electrodynamometers and instruments of similar construction are unsuitable for many purposes, owing to the fact that deflections of the movable member are indicated upon a dial by a pointer in such manner that they may be read only with difficulty and inconvenience. Such instruments are also unsuitable for portable use, since mercury-cups or delicate suspension means, or both, are necessary features. By means of my invention all such objectionable details are avoided, and hence the instrument is peculiarly adapted to portable use as a precision or calibration instrument.

My invention is illustrated in the accompanying drawings, in which—

Figure 1:
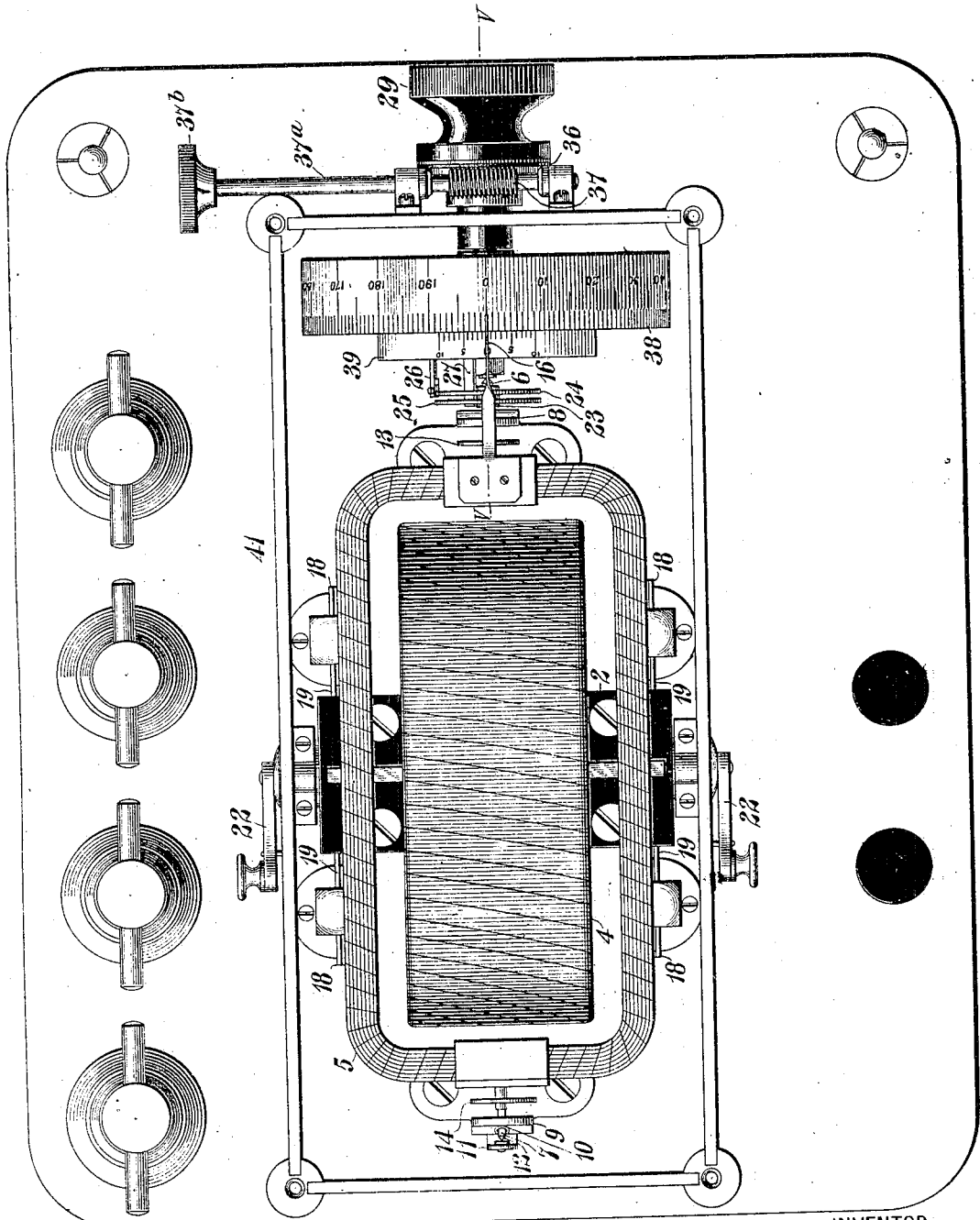
Figure 4:
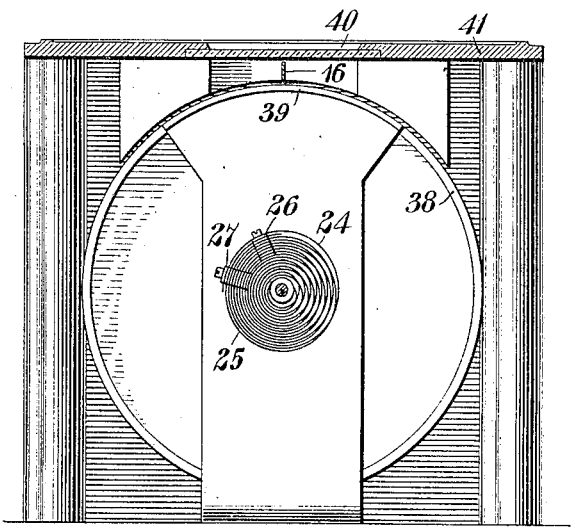
Figure 5:
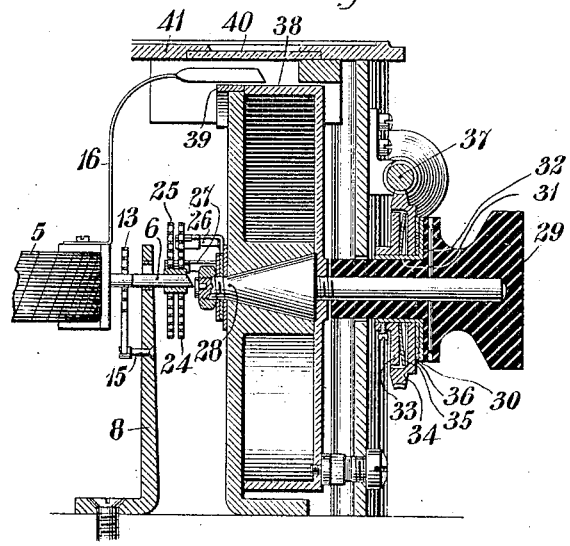

Figure 1 is a plan view with the cover removed of the instrument constructed in accordance therewith. Fig. 2 is a view in side elevation of the instrument shown in Fig. 1, one side of the case having been removed and the cover being shown in section. Fig. 3 is a detail view of one of the pedestals for supporting the movable coil of the instrument. Fig. 4 is a sectional view on the line IV IV of Fig. 2, and Fig. 5 is a part sectional view on the line V V of Fig. 1.

Rigidly mounted upon a suitable base 1 by means of an insulating-strip 2 and bolts 3, which pass through the said strip and base, is a coil 4, the plane of the coil being vertical. Supported in the field of the coil 4 with its plane horizontal and its major axis substantially coincident with that of the coil 4 is a coil 5. The supports for this coil comprise knife-edge trunnions 6 and 7, secured to the coil in any suitable manner in line with its major axis and pedestals 8 and 9, having bearing-surfaces 10 near the free ends thereof upon which the knife-edges of the trunnions 6 and 7 rest. The pedestal 9 is provided with a stop 11, against which the pointed end 12 of the trunnion 7 bears, longitudinal movement of the coil 5 being thereby prevented. Oppositely-coiled springs 13 and 14 are mounted with their inner ends connected, respectively, to the knife-edge trunnions 6 and 7 and with their outer ends connected to the pedestals 8 and 9 by means of screws or pins 15, having their ends solid. These springs are provided merely for the purpose of conducting the current into and out of the movable coil 5.

Secured to one end of the coil 5 is a suitable pointer 16, the purpose of which will be hereinafter more fully set forth. Means for raising the movable coil 5 from its bearings when the instrument is not in use comprise springs 17, which are adapted to sustain the weight of the coil, posts 18, to the free ends of which the springs 17 are secured and which are joined at their other ends by means of bars 19, projections 20, secured to said bars, eccentrically-mounted cams 21, which are adapted to engage the projections 20, and suitable operating-handles 22.

When the handles 22 are in the full-line position shown in Fig. 2, the coil 5 is supported by means of the knife-edge bearings and the instrument is in condition for use. In this case the springs 17 serve to prevent an undue amount of rotation of the coil 5 and as cushions to prevent injurious shocks in case the coil is turned quickly to the limit of its movement.

When the instrument is not in use, the operating-handles 22 may be thrown to the dotted-line position, in which case the posts 18 and the attached springs 17 are raised, so as to support the coil 5 independently of its knife-edge bearings.

The free end of the knife-edge trunnion 6 is provided with a bushing 23, to which the inner ends of two oppositely-coiled spiral springs 24 and 25 are secured, the outer ends of said springs being secured to independently-adjustable abutments 26 and 27. The said abutments are secured to the end of an arbor 28, which is provided at its outer end with a milled knob 29 for effecting coarse adjustment of the instrument.

Mounted upon the knob 29 is a metallic bushing 30, having a cylindrical portion 31 and an annular portion 32. Rigidly secured to the cylindrical portion 31 of the bushing is a washer 33, and between the washer 33 and the annular portion 32 of the bushing is loosely mounted a worm-wheel 34. Interposed between the worm-wheel 34 and the washer 33 is a spring-washer 35, that presses the worm-wheel 34 against a felt or other fibrous washer 36, which is interposed between the worm-wheel and the annular portion 32 of the bushing 30. Exact or fine adjustment is effected by means of worm-wheel 34 and worm 37, the latter being formed or mounted upon a spindle 37$^a$, having a knob or head 37$^b$.

Mounted upon the inner end of the arbor 28 is a cylindrical scale 38, and adjacent thereto at the upper side is a stationary index and vernier-scale 39. When the instrument is in its zero position, the pointer 16 is adjusted so that it lies directly over the stationary index 39 and the zero-point on the rotary cylindrical scale 38. Directly above the end of the pointer and the two scales is a window 40 in the cover of the case 41 of the instrument.

In the operation of the instrument currents are passed through the coils 4 and 5, and the reaction between the two coils causes the coil 5 and its pointer 16 to turn upon the knife-edge trunnions 6 and 7 against the action of the springs 24 and 25. In order to ascertain the value of the force which caused the movement of the coil 5, the arbor 28 and the scale 38 are turned, by means of the knob 29, until the springs 24 and 25 return the pointer to approximately the zero-point of the stationary vernier-scale. Exact adjustment of the pointer may be effected by means of the worm 37 and the worm wheel 34, since the frictional engagement between the spring-washer 35 and the adjacent parts will cause the movement of the worm-wheel to be transmitted to the arbor 28. When the magnetic force causing the rotation of the coil 5 is exactly counterbalanced by the torsion of the spiral springs 23 and 24, the pointer 16 will assume a position coincident with the zero-point on the stationary scale 39 and the division on the rotatable scale 38, which lies directly under the pointer and opposite the index, may be read as the deflection of the instrument.

The details of construction may of course be varied from what I have specifically shown and described without departing from my invention.

I claim as my invention—

1. In an electrical measuring instrument, the combination with a movable member, of a pointer, a spring concentric with the axis of said movable member and having one end attached thereto, an arbor to which the other end of the spring is attached, a rotatable scale carried by said arbor, and a stationary index adjacent to said rotatable scale.

2. In an electrical measuring instrument, a stationary coil and a movable coil having coincident axes, a spring concentric with said axes and having one end connected to the movable coil, an arbor to which the other end of the spring is attached, a rotatable scale carried by the arbor, and a stationary index and vernier-scale adjacent to said rotatable scale.

3. In an electrical measuring instrument, the combination with a movable member, of two oppositely-coiled spiral springs each of which has one end attached thereto, an arbor to which the other ends of the springs are attached, a rotatable scale carried by the arbor, and a stationary index adjacent to said rotatable scale.

4. In an electrical measuring instrument, the combination with a stationary coil, of a movable coil having its axis coincident with that of the stationary coil, pivots for the said movable coil, spiral springs having their inner ends attached thereto, an arbor to which the outer ends of the springs are attached, a pointer carried by the movable coil, a rotatable scale carried by the arbor, and a stationary index adjacent to said rotatable scale.

5. In an electrical measuring instrument, a stationary coil and a movable coil having coincident horizontal axes, pivots attached to said movable coil, spiral springs each having one end attached to one of said pivots, an arbor to which the other ends of the said springs are attached, a pointer carried by the movable coil, a rotatable scale carried by the arbor, and a stationary index and vernier-scale adjacent to said rotatable scale.

6. In an electrical measuring instrument, the combination with a stationary coil, and a movable coil having a pointer, of a stationary scale and a movable scale adjacent to each other and to the pointer, and a yielding, resilient connection between the movable coil and the movable scale.

7. In an electrical measuring instrument, the combination with a stationary coil and a movable coil in inductive relation to each other, said movable coil having a pointer, of a stationary scale and a movable scale adjacent to each other and to said pointer, and a yielding, resilient connection between the movable scale and the movable coil.

8. In an electrical measuring instrument, the combination with a stationary coil and a movable coil in inductive relation to each other, said movable coil having a pointer, of a stationary index, and a movable scale adjacent to said pointer and one or more springs connecting the movable coil and the movable scale.

9. In an electrical measuring instrument, the combination with a stationary coil and a coil supported upon knife-edge bearings in inductive relation to said stationary coil and provided with a pointer, of a stationary index, a movable scale and one or more springs connecting said movable scale to said movable coil.

10. In an electrical measuring instrument, the combination with a stationary coil, a movable coil mounted upon knife-edge bearings and provided with a pointer, and means for raising and supporting said coil independently of its bearings, of a stationary index, a movable scale and one or more springs interposed between said scale and the movable coil.

11. In an electrical measuring instrument, the combination with a stationary coil and a movable coil pivotally supported in inductive relation thereto and having a pointer, of a stationary index, a rotatable scale, one or more springs connecting said scale to said movable coil, and means for rotating said scale.

In testimony whereof I have hereunto subscribed my name this 11th day of August, 1904.

THEODORE ABTMEYER.

Witnesses:
FRANK BRADLEY,
BIRNEY HINES.